(12) United States Patent
Breuer

(10) Patent No.: US 12,207,114 B2
(45) Date of Patent: Jan. 21, 2025

(54) METHOD FOR NETWORK OPTIMIZATION OF A CELLULAR NETWORK

(71) Applicant: Telit Cinterion Deutschland GmbH, Munich (DE)

(72) Inventor: Volker Breuer, Botzow (DE)

(73) Assignee: Telit Cinterion Deutschland GmbH, Munich (DE)

( * ) Notice: Subject to any disclaimer, the term of this patent is extended or adjusted under 35 U.S.C. 154(b) by 296 days.

(21) Appl. No.: 17/783,095

(22) PCT Filed: Dec. 8, 2020

(86) PCT No.: PCT/EP2020/084992
§ 371 (c)(1),
(2) Date: Jun. 7, 2022

(87) PCT Pub. No.: WO2021/116062
PCT Pub. Date: Jun. 17, 2021

(65) Prior Publication Data
US 2023/0011159 A1    Jan. 12, 2023

(30) Foreign Application Priority Data

Dec. 10, 2019  (EP) .................................... 19214661

(51) Int. Cl.
*H04W 24/08* (2009.01)
*H04W 16/28* (2009.01)
*H04W 24/10* (2009.01)

(52) U.S. Cl.
CPC ........... *H04W 24/08* (2013.01); *H04W 16/28* (2013.01); *H04W 24/10* (2013.01)

(58) Field of Classification Search
CPC ...... H04W 24/08; H04W 24/10; H04W 16/28
(Continued)

(56) References Cited

U.S. PATENT DOCUMENTS

2015/0358833 A1  12/2015  Konishi et al.
2016/0029253 A1   1/2016  Sarkar et al.
(Continued)

FOREIGN PATENT DOCUMENTS

| CN | 110476454 | 11/2019 | |
|---|---|---|---|
| IN | 201937009821 | 4/2019 | |
| WO | WO-2019196906 A1 * | 10/2019 | .......... H04J 11/0073 |

OTHER PUBLICATIONS

Huawei et al: "General considerations on connected mode for NPN": 3GPP TSG-RAN WG2, Meeting 108; Reno, USA, Nov. 18-22, 2019.

(Continued)

*Primary Examiner* — Peter G Solinsky
(74) *Attorney, Agent, or Firm* — PEARL COHEN ZEDEK LATZER BARATZ LLP

(57) ABSTRACT

Provided is a method for a first base station operating with a cellular network, covering a first cell area and being connectively coupled to a second base station supporting beamforming, covering a second cell area, wherein a plurality of user equipments is located in said first cell area. It includes sending a message representative of an instruction to perform at least one automatic neighbor relation measurement to at least one of the plurality of user equipments located in said first cell area, receiving at least one automatic neighbor relation message from said at least one user equipment, and omitting said at least one user equipment from further considering for further automatic neighbor relation evaluation, when said automatic neighbor relation message indicates that said user equipment is located outside of the second cell area.

14 Claims, 3 Drawing Sheets

(58) Field of Classification Search
USPC .......................................................... 370/252
See application file for complete search history.

(56) References Cited

U.S. PATENT DOCUMENTS

| | | |
|---|---|---|
| 2019/0132777 A1 | 5/2019 | Park et al. |
| 2019/0357100 A1 | 11/2019 | Ramachandra et al. |
| 2022/0046497 A1* | 2/2022 | Wang .................... H04W 24/10 |

OTHER PUBLICATIONS

International Search Report (PCT/ISA/210) and Written Opinion (PCT/ISA/237) mailed on Jan. 20, 2021 by the European Patent Office as the International Searching Authority for International Application No. PCT/EP2020/084992—[15 pages].
Ericsson R3-161902 "Automatic base station relations in NR": 1821 3GPP, TSG-RAN WG3 #93, dated Aug. 13, 2016, presented in Gothenburg, Sweden, Aug. 22-26, 2016. Downloaded from 3GPPtsg_ran\WG3_lu, No. TSGR3_93.

* cited by examiner

METHOD FOR NETWORK OPTIMIZATION OF A CELLULAR NETWORK

CROSS-REFERENCE TO RELATED APPLICATIONS

This application is a National Phase Application of PCT International Application No. PCT/EP2020/084992, International Filing Date Dec. 8, 2020, claiming the benefit of European Patent Application No. 19214661.1, filed Dec. 10, 2019.

FIELD OF THE INVENTION

The present invention relates to a method for a base station operating with a cellular network. The invention also pertains to a base station using said method.

BACKGROUND OF THE INVENTION

In the field of wireless cellular communication it is a well-established procedure that the base stations of the cellular network maintain neighbor lists indicating which base stations are in proximity of the base station, that means in particular, to which base stations a handover of a user equipment may happen. While this neighbor list was originally configured by the network operator, in later generations of the cellular technology standards a procedure called self-organizing networks (SON) was introduced. This approach contained that the neighbor lists are amended by means of signals from user equipments operating with the base station, e.g. when camping on the base station or when being in connected mode, measuring neighbor cell signals and providing information from all other base stations that can be decoded. This lead to an immense reduction of maintenance work and the neighbor lists were quickly updated even when a new base station was installed in the field. The approach is also called automatic neighbor relation (ANR) resp. when performed in idle it is called MDT (minimization of drive tests), which includes reporting of all cells the user equipment camped upon once it reconnects to a base station of said cellular network.

However this approach is based on the concept that the area which is supposed to be covered by the cellular network is by now more or less fully covered with the cell areas of the respective base stations, and all base stations fulfill basically the same task in the same radio access network.

These propositions are not applicable for 5G (New Radio, NR) in general anymore, especially not for any deployments of 5G above 6 GHz i.e. in frequency range 2 (FR2).

FR2 is currently considered for indoor, hot spots or areas with the demand for high data throughput. Here it will be the case that base stations in lower frequency areas are available and coverage oriented, while base stations in higher frequency areas are more throughput oriented but by far do not cover permanently a larger area, or cells in that range from a larger consecutive coverage area, instead they are typically using beamforming and cover a certain small area with several beams. The first type of base stations may even be such supporting 4G, in the currently defined non-standalone (NSA) 5G rollout.

For the first type of base stations, i.e. the one's in the low frequency range—also called FR1—they can rely on the well-known concepts developed for LTE such as MDT (minimization of drive tests), where the user equipment reports at its next connection setup all cell IDs where the user equipment camped on in the meantime. Or more connection oriented methods such, where user equipment in dedicated mode receives dedicated measurement instruction for expected neighbor cells to build up neighbor cell relations. These concepts are right now also standardized for NR.

However these approaches are not sufficient for 5G deployed in FR2, as for this type of base station architecture the common ANR/SON approach is not workable. As the low-frequency base stations maintain the registration of user equipments and then hand over to the higher frequency base stations for carrying out high throughput communication, there is a need to receive measurements of the higher frequency neighbor base stations.

So when moving in idle the user equipment will not always change its serving base station just for MDT reporting because the user equipments would always need to hop forth and back as in FR2 no contiguous coverage is ensured. Furthermore the base stations in FR2 cover their area via multiple beams hence for those base stations it is important to evaluate which beams really attract or cover users and which not.

Therefore it needs an approach to handle the ANR message and furthermore improve the coverage for user equipments in FR2. Hence it is the goal of present invention to overcome the mentioned disadvantages and to propose a solution for an improved handling of automatic neighbor relation management for base stations in the new scenario of New Radio resp. for higher frequency ranges (FR2).

Further alternative and advantageous solutions would, accordingly, be desirable in the art.

SUMMARY OF THE INVENTION

For this it is according to a first aspect of the invention suggested a method to for a first base station according to claim 1. It is further suggested according to a second aspect of the invention a base station according to claim 9.

According to the first aspect of the invention it is proposed a method for a first base station operating with a cellular network, covering a first cell area and being connectively coupled to a second base station supporting beamforming, covering a second cell area, wherein a plurality of user equipments is located in said first cell area, the method comprising the steps of:

sending a message representative of an instruction to perform at least one automatic neighbor relation measurement to at least one of the plurality of user equipments located in said first cell area, receiving at least one automatic neighbor relation message from said at least one user equipment, omitting said at least one user equipment from further considering for further automatic neighbor relation evaluation, in case said automatic neighbor relation message indicates that said user equipment is located outside of the second cell area.

The first aspect of the invention relates to a first base station operating with a cellular network. The cellular network is one that is at least supporting the technology standards of 4G and 5G.

The first base station is a base station designated for coverage oriented servicing of a cell area. That means it is the goal that the plurality of base stations of the type of the first base station, which belong to the cellular network, is to cover seamlessly the coverage area of the cellular network. Of course coverage holes may exists, but that does not change the general approach.

Such base stations of the type of the first base stations are either 4G base stations in the non-stand-alone (NSA) approach of 5G roll out. For a later phase of stand-alone operation, the first base station is a 5G or beyond base station of a first type that is designated for covering the whole cell area. Such base stations (gNBs) are also called anchor-cells or wide area base stations. Typically they operate in a frequency range being part of FR1, preferably even below 2 GHz which allows to perform a full coverage with a reasonable number of base stations.

The first base station is communicatively connected to a second base station which is supporting beamforming, and which is covering a second cell area. Beamforming as a MIMO technique for overcoming increased MCL (minimum coupling loss) especially in higher frequency regions is a known technique applied in NR for normal operation. Beam management for NR was studied in context of Rel. 14 and most important beam management functionalities are described e.g. TR38.802 in chapter 6.1.6.1 Beam management.

In NR, beam management is defined as follows:

Beam management: a set of L1/L2 procedures to acquire and maintain a set of TRP(s) and/or UE beams that can be used for DL and UL transmission/reception, which include at least following aspects:

Beam determination: for TRP(s) or UE to select of its own Tx/Rx beam(s).

Beam measurement: for TRP(s) or UE to measure characteristics of received beamformed signal.

Beam reporting: for UE to report information of beamformed signal(s) based on beam measurement.

Beam sweeping: operation of covering a spatial area, with beams transmitted and/or received during a time interval in a predetermined way. It also includes measurements related to a beam in the DL which can be reported in the UL in the same or another beam. However measurement and relation between UL/DL beam and applied technique is not subject of this invention it is rather considered that such mechanisms are known and can be applied here within said technique. It is also known that a user equipment can not only measure one beam but also neighbor beams. However the technique mentioned hereafter can be applied when reporting only one beam, the strongest, or no beam or besides the strongest also a set of beams above a certain level, or in general beams above a certain level. The essence is whether a user equipment being in potential coverage area i.e. the second cell area momentary receives at least one beam being suitable for communication or whether this only can be achieved after further adjustment of the beams.

In that sense covering does not mean, that in each location of the second cell area it is permanently or even in the majority of time a connection link possible for a user equipment with the second base station. This is a throughput oriented base station, and it is supporting the technology standard of 5G or beyond for high frequency ranges (FR2).

The 5G technology standard is designed that way, that the base stations of the type of the first base station are available for user equipments to camp on, while—in particular depending upon the requested throughput—for a connection setup a switch reps. handover to, or a multi-carrier setup including said base station of the type of the second base station is needed.

This also requires that the first base station has accurate knowledge about which parts of the second cell area are covered by the at least one second base station in proximity, in particular that the camping user equipment which might want to setup a connection has the chance to do so due to the current coverage.

This is where the invention comes into play.

The general concept of automatic neighbor relation messages is known, but requires adaptation for this new scenario.

Therefore it is proposed according to the first aspect of the invention that the first base station sends a message representative of an instruction to perform at least one automatic neighbor relation measurement to all or a subset of those user equipments that are currently located in the first cell area.

Effectively these user equipments are camping on the first base station, therefore they are known at that time, if this should be required for sending that message.

With this ANR message the first base station is supposed to trigger such automatic neighbor relation measurements. Such automatic neighbor relation measurements at least comprises carrying out for one or more base stations, to receive signals and measure signal strength. In particular it may comprises, if necessary—to decode a broadcast of system information of the one or more neighbor base station.

It is also encompassed that the first base station indicates with the sent message from which one or more base stations the measurements are supposed to be carried out.

Preferably the user equipments carry out such measurements and perform evaluations on basis of the measurements, which in particular indicate if it would be sufficiently strong to operate with.

Such measurements and evaluations need to be done ideally by all users equipments within said area and not only those which are currently connected. This leads already to an additional problem to solve that user equipments from different states may be equally involved in said approach even when this means for several of them also performing a state change.

Consequently, the first base station receives from said user equipments at least one automatic neighbor relation message. Preferably it is a plurality of messages, from all user equipments where the first base station sent the message to for instructing the ANR measurement.

Such messages are representative of the automatic neighbor relation measurements from the user equipments, and in particular of the evaluation of such measurements.

The first base station evaluates the received ANR messages for figuring out if the sending user equipment is located outside of the second cell area. The second cell area is the cell area which could be covered by the second base station, but that does not necessarily mean that the user equipment received signals from the second base station.

In that case, that the user equipment is located outside of the second cell area, the user equipment is omitted from the next requests for ANR measurements for this second base station. This is advantageous in particular for such user equipment that are operated stationary, and it reduces power consumption for carrying out measurements and sending the ANR messages completely in vain.

However it is suggested that the step of considering said at least one user equipment in case the automatic neighbor relation message indicates that said user equipment is located inside of the second cell area.

For further handling of automatic neighbor relation evaluation those user equipments are evaluated that indicate that they are located inside of the second cell area. Hence for further ANR messages only those user equipments are instructed to carry out further ANR measurements after certain time period, which are found to be inside the second cell area of the second base station.

This separation requires to figure out if the user equipment is located inside the second cell area. This is possible by a couple of different operations or submitted data.

Preferably it is suggested that said automatic neighbor relation message indicates that said user equipment is located inside the second cell area, in case at least one of the following conditions apply:
- the automatic neighbor relation message comprises a measurement result related to the second base station;
- timing advance to the first base station is lower than a predefined threshold value;
- a position value contained in the automatic neighbor relation message matches to the geographical boundaries of the estimated second cell area.

The first option comprises that a measurement result from signals transmitted from the second base station are received at the respective user equipment and is reported with the ANR message from the user equipment. In particular this is the case when the measurement result is above a certain threshold, like a predefined suitability level. The measurement can consider one beam, a set of beams, or a number of beams received above a certain threshold, i.e. a user equipment may be located in the overlapping area of two beams.

When the user equipment can sufficiently good receive signals from the second base station, it is located in the second cell area.

However, the reverse conclusion does not apply, therefore it requires additional options to find out if the user equipment is located in the cell area, in case it did not supply a measurement result.

Therefore the second option is that the value of the timing advance (TA) to the first base station is lower than a predefined threshold value. This timing advance value is in particular of relevance when the first base station and the second base station are located close together, in particular when installed on the same tower.

The timing advance value would for that preferably be part of the automatic neighbor relation message from the user equipment, at least optionally.

With the timing advance value a rough estimation of distance from the first base station is available, which gives a good picture if the user equipment is located in the second cell area or not. As NR applies a time frequency grid for all resource allocations towards a dedicated user equipment said TA needs to be known by the user equipment in anyway during UL reporting. Hence said value can be included by some or all user equipments at no burden in the UL report, or is known by the base station when the user equipment attempts to report.

However as especially in the first step to reach all user equipments the measurement advice can be provided by broadcast the reporting of the TA can be of benefit. This applies in particular later on the discarding of user equipments having send an empty report which have a too large TA and thus reduce the number of user equipments to be considered in the further steps to a smaller number.

With the third option it is proposed to provide with the automatic neighbor relation message a position value. This might be a geo-coordinate pair in terms of longitude/latitude, either absolute or as difference values to a reference point, in order to save bits. Also a geo-code, like a spatial quadcode, which in particular has tunable resolution, may be used to provide a representative of the position value. Such position value may then be matched within the geographical boundaries of the cell area. Typically these geographical boundaries are defined by a vector of center position longitude/latitude and radius. Preferably a tolerance value is added on the radius to cover good signalling conditions situations.

With that an accurate calculation for answering the question if the user equipment is located inside of the second cell area can reliably be given, but it requires that the ANR message from the user equipment is enhanced by that value vector.

With regards to the relation of the different options it is proposed in a further advantageous embodiment that said automatic neighbor relation message comprising a location indication only, in case the automatic neighbor relation message is not comprising a measurement results of the second base station. This embodiment preferably saves information and processing effort, as a redundant information in the ANR message is avoided. The first base station knows that the user equipment is within the second cell area, if a measurement is received. Hence the first base station would not even look on the location indication (or the timing advance value) for evaluating if the user equipment is in the second cell area.

Hence this redundant information may be omitted and thus save efforts at the user equipment site.

According to another preferred embodiment it is further proposed the steps of:
- analyzing a plurality of automatic neighbor relation messages whether information relating to the second base station are comprised,
- instructing the second base station to modify beamforming considering the location indications of said plurality of automatic neighbor relation messages.

With this embodiment it is proposed not only to evaluate the status quo of cell area coverage through the second base station, but also to take measures in case the coverage is not in line with the spatial distribution of user equipment, in particular those which are operating stationary, like certain types of IoT devices, like metering devices, house automation and security equipment etc. As part of this embodiment it is therefore suggested that the first base station additionally analyzes the plurality of automatic neighbor relation messages which are ascertained through the method step of receiving at least one automatic neighbor relation message.

As part of this it is checked if in the ANR message information relating to the second base station are comprised.

Such information relating to the second base station in particular comprises of one out of the group of:
- a cell identifier of the second base station,
- a beam identifier relating to the second base station,
- a power measurement value of signals received from the second base station,
- information relating to an identity where a measurement was instructed for.

The information provided in the ANR message therefore covers in particular one out of the group of cell identifier of the second base station or a beam identifier of the second base station. With that it is clear for the first base station, that the user equipment was able to decode signals of at least one beam from the second base station. Hence the user equipment is located inside the second cell area.

The same finding holds true for the case that a power measurement value of signals received from the base station is submitted with the ANR message. This is the most preferably situation, as this is where ANR messages are designed for. When measurements where successful, resp. signals were sufficiently strong, then the user equipment is operating in the second cell area. Finally information relating to an identity where a measurement was instructed for are considered. This relates to dedicated measurement instructions for a user equipment. Such dedicated measurement instructions might relate to measure a certain value in a certain cell. When that certain values for the respective second base station is available, this indicates that the user equipment is located in the second cell area.

When it turns out that a remarkable amount of user equipments are located in the second cell area, according to their position, but cannot sufficiently measure signals from the base station, then the first base station may take measures to improve this situation.

Hence it sends an instruction to the second base station for modifying the beamforming. Such instruction in particular considers the received location indications in the ANR message and therefor encourages the second base station to amend the beamforming for covering more user equipments. Preferably the user equipments, e.g. indicate in the ANR message or through its capabilities information in particular during registration, if they have interest (or is allowed for getting high throughput) in operating with the second base station for getting a high throughput. If this is not the case, that user equipment resp. its position may be ignored for amending the beamforming of the second base station. Especially here also NSSAI, i.e. slice selection assistance information provided by the user equipment during initial registration can be used, i.e. each user equipment provides during registration the S-NSSAI (Single-Network Slice Selection Assistance information) of the HPLMN, including QoS Information (refer to clause TS23.501 5.7): the subscribed Session-AMBR, Default 5QI and Default ARP. The 5QI includes an indication related to requested type of service the user equipment may want to receive and hence it can also be checked whether the subscription is inline with said requested service and hence whether said user equipment would be as suitable candidate in case of service request being served by the $2^{nd}$ high throughput base station.

As the target of the network optimization changes for NR deployments especially those in FR2, it is no more intended to achieve a continuous coverage—as this is not possible—but rather to optimize and focus the beams of the user equipments supposed to offer in FR2 in such a way that an as large as possible population of all user equipment being present in the second cell are could be served by said second base station, i.e. not to maximize the area but the number of served user equipments.

Preferably the instruction for such measurements is carried out through dedicated instructions. It is suggested that the step of sending a message to at least one user equipment is carried out by means of at least one of broadcast or multicast signalling, the method further comprising the step of carrying out a second step of signalling to the at least one user equipment, that is further considered for further automatic neighbor relation evaluation, in a dedicated type signalling. This embodiment means, that for the first request for ANR messages no dedicated signalling is used. Therefore with a common broadcast resp. multicast (for groups) instruction all user equipments in a cell area are instructed to send first ANR messages.

This broadcast approach is not useful when it is was found out that a couple of user equipments are not located in the second cell area. Hence it is proposed that after the first evaluation on the first base station side the further instructions to the remaining user equipments are carried out in a dedicated type of signalling.

Such dedicated type of signalling is in particular during an open connection or through dedicated downlink channels sensible. That means that the user equipment may immediately after reporting of the first measurement request receive said second request via RRC signaling. Or the user equipment is held in connection unless preparation is done and then accordingly instructed such waiting time can be overcome by applying C-DRX but for high-end user equipments should not be an issue anyway. In a less preferred way such user equipment can also be released to idle and paged for instruction some time later.

Preferably the step of sending a message to at least one user equipment by means of broadcast or multicast is carried out considering the fraction of user equipments being in reach of the second base station and being in reach of the first base station compared to all user equipments being in reach of the first base station and being capable of communicating to the second base station.

This embodiment is for the question, when to switch back to broadcasted/multicasted instructions after the first step of the inventive method was carried out. Obviously after installation or activation of the first and/or the second base station, the first step is carried out with broadcasted instructions. However, it is not advantageous to never come back to that approach, in particular in the scenario of moving user equipments and amendable beamforming of the second base station.

E.g. when a couple of users with user equipments are active in a certain area, e.g. a restaurant terrace, then it is preferable to amend the beamforming of the second base station in order to match this terrace.

When the weather changes, most of the people will go in the restaurant, find some shelter or leave the place entirely. Then to focus the beamforming on the terrace makes no sense, as well as requesting from the same group of user equipments ANR measurements, although they might have left the cell area of the respective second base station, while still staying in the first cell area around the first base station.

Hence it is suggested that the first base station evaluates the received ANR messages, in particular those in response to the dedicated signalling.

The simple approach is to apply a time trigger, that is after a predetermined time of e.g. 1 hour a broadcast/multicast message is sent out to all user equipments camping on the first base station. Also when a topology change, e.g. a new base station of the first or second base station's type in proximity of the first base station, could be used as a trigger for broadcasted/multicasted instruction signalling.

In a more elaborate approach it is suggested that it is considered the fraction of user equipments in reach of the second base station compared to those that are located in the first cell area being capable of communication to the second base station. The fraction therefore represents the share of those who are in reach of the second base station from those situated in the first cell area and that could be reached by the second base station.

The latter condition relates to the fact the user equipments which are only capable of operating with 4G base stations may not be accounted for the fraction.

The first base station known about the connected core element, in particular the MME resp the AMF, if the user equipments are capable of communicating with the second base station.

Hence it is advantageously to define a certain threshold of that fraction, for starting again on broadcasting to reset the whole situation.

That fraction threshold is either fixed by setting a certain percentage, e.g. below 50%.

Preferably the threshold is adaptive, in that a reduction of percentage within the last period of time, e.g. 10 minutes or an hour, depending on the need for reacting, is taken into account to identify a drop as in the terrace example above. This adaptive threshold is advantageous as it automatically adapts to the current situation. Even when the restaurant terrace was fully equipped with people, a good share of user equipment might not be reachable by the beams of the second base station due to the even distribution over a comparable large place. Hence here a comparable low fraction could in the case of a fixed threshold permanently restart the broadcasting, although no improvement can be achieved e.g. by amending the beams.

Hence it is preferable to notice a drop of fraction also from a lower total level.

According to a second aspect of the invention it is proposed a base station operating with a cellular network, covering a first cell area and being connectively coupled to a second base station supporting beamforming, covering a second cell area, wherein a plurality of user equipments is located in said first cell area, the base station being configured to:
- send a message representative of an instruction to perform at least one automatic neighbor relation measurement to at least one of the plurality of user equipments located in said first cell area,
- receive at least one automatic neighbor relation message from said at least one user equipment,
- omit said at least one user equipment from further considering for further automatic neighbor relation evaluation, in case said automatic neighbor relation message indicates that said user equipment is located outside of the second cell area.

The base station of this aspect of the invention relates to the first base station of the first aspect of the invention.

It is equipped with transmitting and receiving circuitry, and at least one antenna. It comprises further processing circuitry to control the transmitting and receiving circuitry. If further comprises preferably volatile and permanent memory at least for holding operating software and configuration data.

The base station is further equipped with communication circuitry for communicating with core network components, like MME or AMF, of the cellular network it belongs to. That communication circuitry is in particular set up wired.

The base station is configured to support the technology standard of LTE (4G) for non-standalone operation, or of New Radio (NR, 5G), or beyond.

Directly or indirectly the base station has further communication circuitry for communicating with the second base station.

Preferably the second base station is installed at the same site, in particular the same tower. It is further foreseen that the first and second base station share hardware components, like antenna, processing circuitry and or memory for carrying out their tasks.

The first base station is configured to send instructions to the second base station.

The second base station is additionally configured to carry out beamforming, that is it is able to operate in higher frequency areas than the first base station and consequently to perform communication tasks with higher throughput than the first base station.

Through the transmitting and receiving circuitry and the antenna the first base station is configured to serve a plurality of user equipments that are capable of supporting the same technology standard like the first base station.

The second aspect of the invention shares the advantages of the first aspect of the invention.

As it is shown this invention advantageously solves the depicted problem and offers a solution which copes with the new scenario of coverage oriented and throughput oriented base station in 5G and beyond in an advantageous way.

BRIEF DESCRIPTION OF THE DRAWINGS

The following description and the annexed drawings set forth in detail certain illustrative aspects and are indicative of but a few of the various ways in which the principles of the embodiments may be employed. Characteristics and advantages of the present invention will appear when reading the following description and annexed drawings of advantageous embodiments given as illustrative but not restrictive examples.

FIG. 1 schematically shows a first base station 2 of the type to which the present invention is applied as an embodiment. The first base station 2 is communicatively coupled to the second base station 3. Both are part of the cellular network 1, which comprises a plurality of base stations of the type of the first 2 and of the second base station 3.

Figure 1:
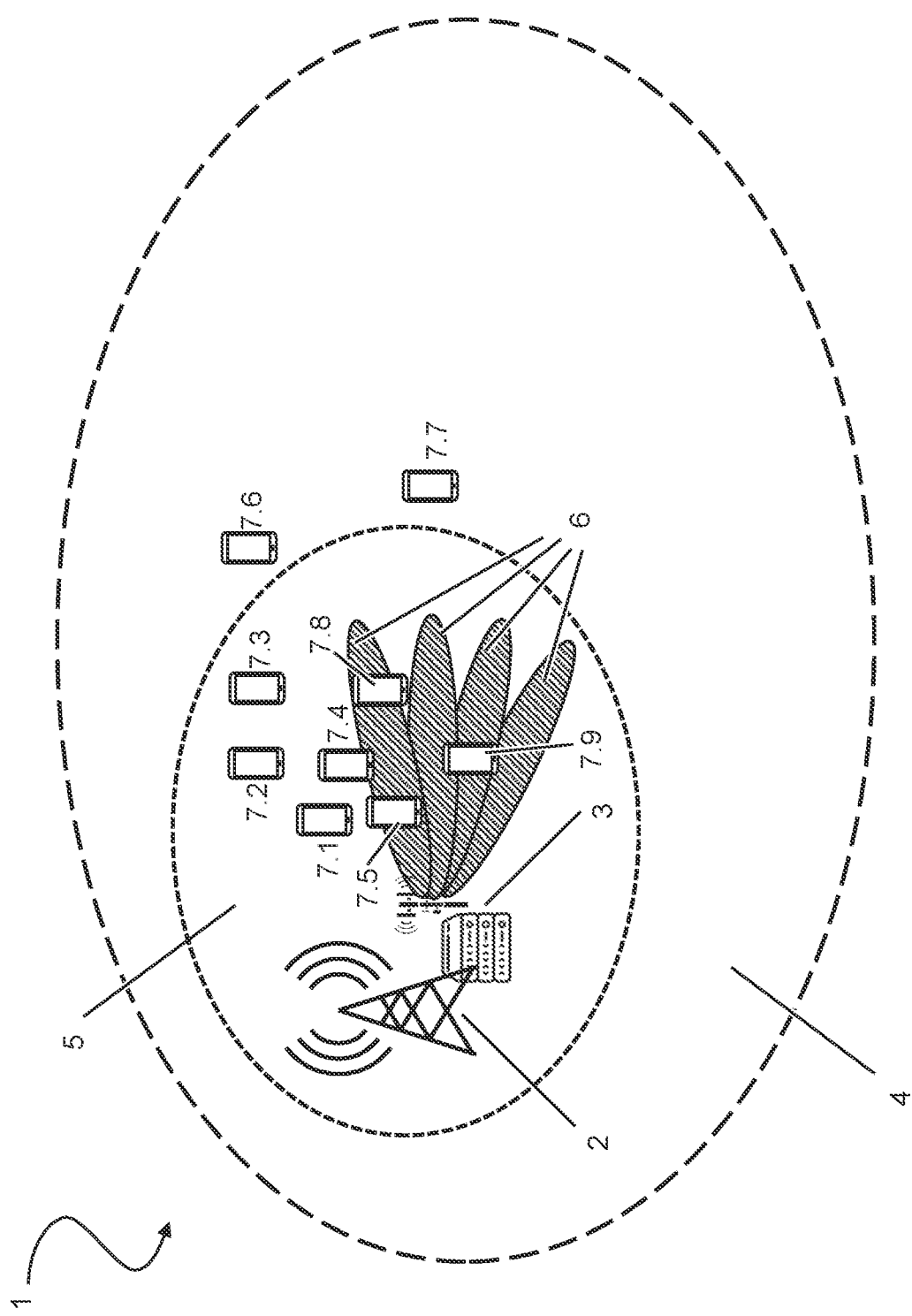
FIG. 1 represents a base station of the type to which the present invention is applied as an embodiment in conjunction with a second base station and user equipments in the cell area of the first base station.

The first base station is in particular operating in the technology standard of 4G or 5G, and beyond. It is a base station for coverage oriented communication. It covers the first cell area 4. As it is coverage oriented, a user equipment 7 which is located in the first cell area 4 is able to operate with the first base station, provided it has sufficient capacity.

The situation is different for the second base station 3. The second cell area 5 is the theoretical coverage area of the second base station. In this exemplary situation first and second base station are installed on the same tower. Hence the first and second cell areas overlap. In this example the second cell area is completely located in the first cell area.

As it is said the second cell area is the theoretical coverage area for user equipments 7 located in the second cell area. Instead only those user equipments can be served when the beams 6 are directed to the position where the user equipment 7 is currently located.

For the various user equipments as shown in FIG. 1 therefore different conditions apply. Under the assumption that all user equipments are capable of operating with both the first and the second base station, the user equipments 7.1-7.9 are all camping on the first base station.

When the first base station would instruct the user equipment to send automatic neighbour relation messages to the first base station the following would apply:

The user equipments 7.6 and 7.7 have received not signals from the second base station. They consequently would provide with the ANR message a location indication, e.g. a geo-position in latitude/longitude.

From that the first base station 2 can derive that they are located outside of the second cell area 5 and can therefore be removed from the list of user equipments that are usable for ANR messages about the second base station 3.

The user equipment 7.5, 7.8 and 7.9 will deliver ANR messages with measurement results and/or additional information about the second base station 3. From that the first base station 2 can derive that these user equipments are located within the second cell area 5, and they are in the range of the beams 6 of the second base station 3 and can therefore operate with the second base station. Such operation may be a high data throughput communication session.

User equipments 7.1, 7.2, 7.3, and 7.4 however would, like the user equipments 7.6 and 7.7, send in their ANR messages an indication of their position, but no measurement results, due to the fact that they cannot receive signals due to the beamforming which does not cover the position of these user equipment.

The first base station would however not omit these user equipments, as they are located inside of the second cell area. A change of beamforming could lead to the situation that they can indeed communicate with the second base station 3.

For the subsequent instructions to send ANR messages the first base station would therefore send instructions, preferably in dedicated mode, to all shown user equipments except user equipments 7.6 and 7.7.

Figure 2:
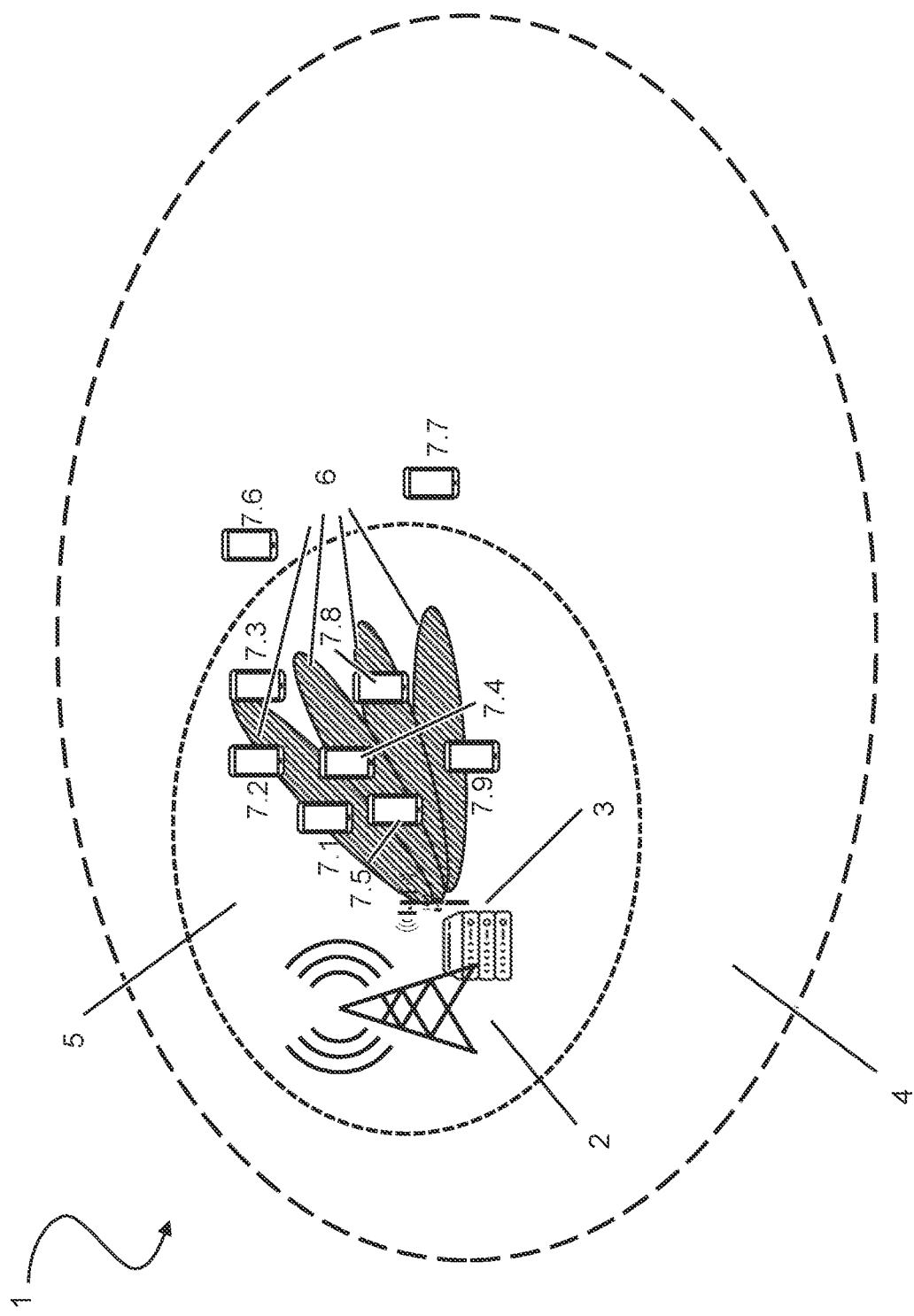
FIG. 2 represents the base station in a second exemplifying embodiment.

From the results of the ANR messages received at the first base station 2 it may preferably take additional measured to improve the coverage situation for the second base station 3. The results of such measures is shown in FIG. 2. Here it is shown that the second base station 3 has, based on instructions received from the first base station 2, amended its beamforming configuration. The first base station analyzed the position information from the user equipments 7 and figured out that a majority of user equipment is not covered by the beams 6.

Hence with the amendments of the beams consequently a way larger share of user equipments located in the second cell area is covered. This is possible due to the ANR messages requested from the single user equipments which were indicating that they are located in the second cell area. Information from user equipments 7.6 and 7.7, which are outside of the second cell area, could be omitted as they would not be able to contribute to better amending the beams 6. Hence it is preferable both for the involved user equipments and the first base station, if they are not instructed to send ANR messages in regards to the second base station 3.

Figure 3:
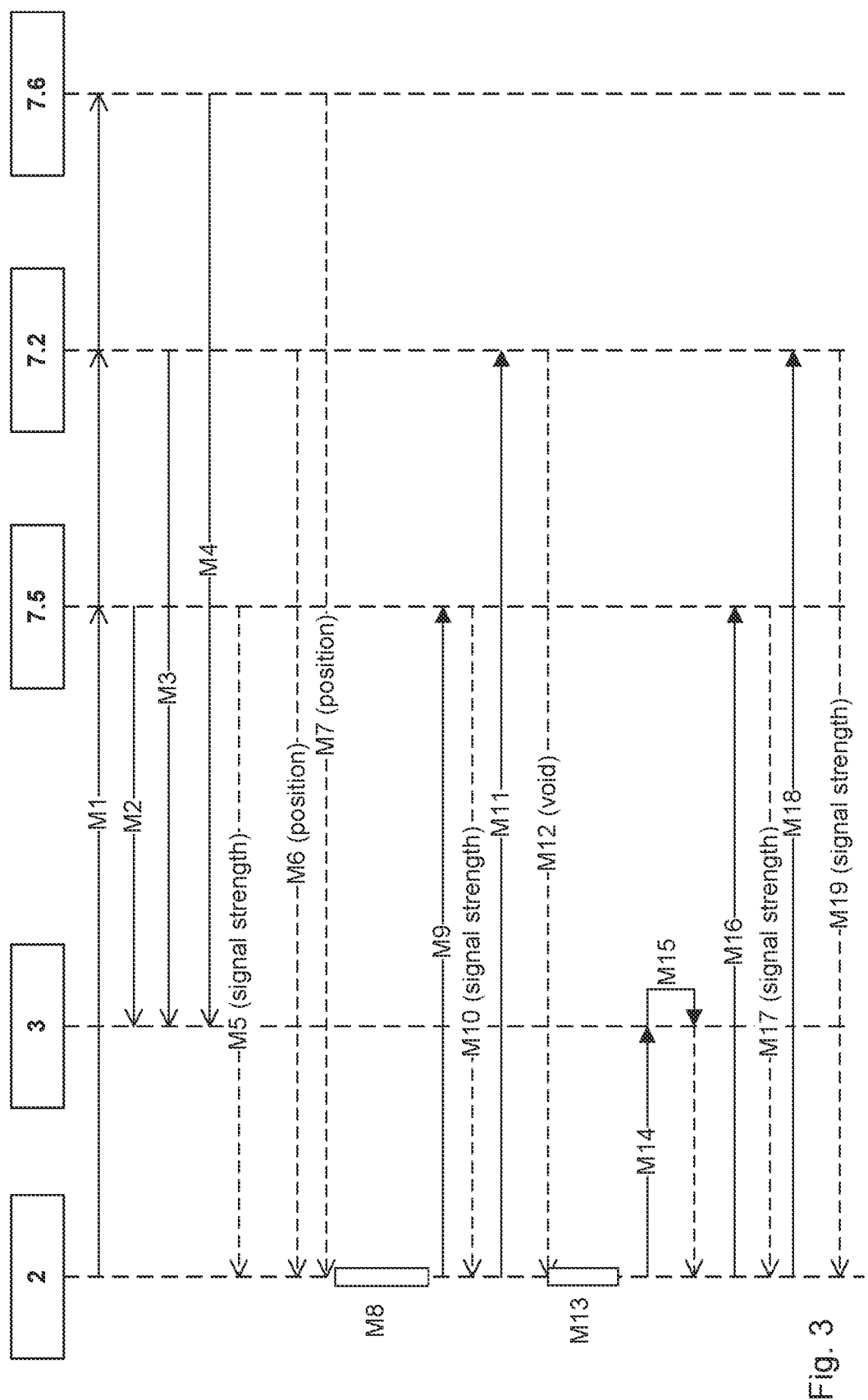
FIG. 3 shows a sequence diagram of an exemplifying embodiment of the inventive method for the base station.

In FIG. 3 it is shown an exemplifying sequence diagram between the first and the second base station and selected user equipments 7.2, 7.5 and 7.6. The user equipments complement to those shown in FIGS. 1 and 2, with the beamforming configuration of FIG. 1.

The message flow starts with instruction message M1 from the first base station 2 to all of the user equipments camping on the first base station, including those shown in the sequence diagram. This instruction message is in particular sent via broadcast, e.g. with system information. Also multicast, that is to a group of user equipments, is included in this option.

With this instruction message the receiving user equipments are instructed to carry out measurements in regards to at least on neighboring base station, in particular one of the type of the second base station.

Such measurements are carried out with messages M2-M4 by each of the receiving user equipments. The messages are as shown to be understood as attempts to measure signals from the second base station 3. However, should the user equipments 7.2, 7.5, 7.6 not in reach of the second base station, resp. a beam of the second base station, then the message would not arrive at the second base station 3.

After the measurement attempts the user equipment report with automatic neighbor relation (ANR) messages M5, M6, M7 to the first base station 2 about the result of the measurement reports.

ANR message M5 comprises the signal strength value of the user equipment 7.5, which is located in direction of one of the beams 6 of the second base station 3. Hence it could carry out measurements and thus indicate to the first base station a comparably high measurement signal value. This indicates to the first base station that user equipment 7.5 is operating in the second cell area and even the beam and should be considered for further ANR messaging. ANR message M6 comprises a position indication from the user equipment 7.2. This position indication is reported as the measurement attempt M3 lead to no result. Of course a measurement signal value might be reported additionally with the ANR message M6.

ANR message M7 also comprises a position indication from the user equipment 7.6. This situation is for the user equipment similar as for user equipment 7.2, as the measurement attempt M4 lead to no result.

In step M8 the first base station evaluates the received ANR message M5, M6, M7. This evaluation step has the main task to figure out which user equipments 7.2, 7.5, 7.6 to consider for further ANR instructions.

Clearly user equipment 7.5 is to keep, as it provided measurement results of the signal strength.

for the user equipments 7.2 and 7.6 the first base station however has to distinguish from the received position indication, if the user equipments are situated in the second cell area or not. This is not the case for user equipment 7.6, which is consequently not considered for further ANR operations.

User equipment is located within the second cell area 5, and therefore the first base station continues to consider this user equipment for the subsequent ANR operation.

Consequently the next ANR request, preferably carried out after some time, is carried out with instruction message M9 to user equipment 7.5. This instruction message is carried out in dedicated signalling, means, only user equipment 7.5 receives this instruction.

In response the user equipment 7.5 carries out again a measurement attempt (not shown), and reports the result to the first base station. In this case user equipment again could measure the signal strength of the second base station and consequently provides with ANR message M10 a value indicative of the measured signal strength of the second base station 3.

Then an ANR request M11 is sent in dedicated signalling to user equipment 7.2. This user equipment 7.2 carries out another measurement attempt but still fails to measure signals from the second base station.

The ANR request M9, M11 in particular instructs the receiving user equipment to carry out a specific measurement from a specific base station, in this case from the second base station 3. Should user equipment 7.2 be in the cell area of another base station of the type of the second base station, then it would not report a possible positive measurement result, as it is not requested. Consequently in message M12 the user equipment 7.2 indicated that no measurement could be carried out.

Optionally another indication relating to the position of the user equipment 7.2 is submitted with ANR message M12. Should the user equipment 7.2 however has left the second cell area 5, it could be omitted from the next ANR messaging.

As this is not the case here, the operation continues, in this case with step M13. In this step the first base station 2 evaluates the ANR message received after the last set of ANR requests.

The outcome of this evaluation step is an instruction sent with message M14 to the second base station 3 for amending the beamforming based on the position information of the user equipments in the second cell area 5 which are not covered by the beams 6.

The second base station 3 consequently carries out a change of beamforming with step M14.

In the next round of ANR requests the first base station sends with message M15 and M17 ANR requests to the user equipments 7.2 and 7.5. As both are now covered by the beams (as shown in FIG. 2), both user equipment will successfully carry out measurement attempts from signals received from the second base station 3.

With the ANR messages M16 an M18 the results are consequently reported to the first base station 2.

Preferably the operation continues with this now comparably optimal configuration of the beams. However, the situation might change. Either in time or through movements of the user equipments 7.

Hence, when further ANR request/message operations turn out, that the fraction of covered compared to the theoretically reachable user equipments falls remarkably, then the operation starts again with the broadcasted ANR request M1.

In the above detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The above detailed description is, therefore, not to be taken in a limiting sense, and the scope of the present invention is defined only by the appended claims, appropriately interpreted, along with the full range of equivalents to which the claims are entitled.

The invention claimed is:

1. A method for a first base station operating with a cellular network, covering a first cell area and being connectively coupled to a second base station supporting beamforming, covering a second cell area, wherein a plurality of user equipments is located in said first cell area, the method comprising the steps of:
sending a message representative of an instruction to perform at least one automatic neighbor relation measurement to at least one of the plurality of user equipments located in said first cell area,
receiving at least one automatic neighbor relation message from said at least one user equipment,
omitting said at least one user equipment from further considering for further automatic neighbor relation evaluation, in case said automatic neighbor relation message indicates that said user equipment is located outside of the second cell area.

2. The method according to claim 1, further comprising the step of considering said at least one user equipment in case the automatic neighbor relation message indicates that said user equipment is located inside of the second cell area.

3. The method according to claim 1, wherein said automatic neighbor relation message indicates that said user equipment is located inside the second cell area, in case at least one of the following conditions apply:
the automatic neighbor relation message comprises a measurement result related to the second base station;
timing advance to the first base station is lower than a predefined threshold value;
a position value contained in the automatic neighbor relation message matches to the geographical boundaries of the estimated second cell area.

4. The method according to claim 3, wherein said automatic neighbor relation message comprising a location indication only, in case the automatic neighbor relation message is not comprising a measurement results of the second base station.

5. The method according to claim 4, further comprising the steps of:
analyzing a plurality of automatic neighbor relation messages whether information relating to the second base station are comprised,
instructing the second base station to modify beamforming considering the location indications of said plurality of automatic neighbor relation messages.

6. The method according to claim 5, wherein said information relating to the second base station is at least one out of the group of:
a cell identifier of the second base station,
a beam identifier relating to the second base station,
a power measurement value of signals received from the second base station,
information relating to an identity where a measurement was instructed for.

7. The method according to claim 6, wherein the step of sending a message to at least one user equipment is carried out by means of at least one of broadcast or multicast signalling,
the method further comprising the step of carrying out a second step of signalling to the at least one user equipment, that is further considered for further automatic neighbor relation evaluation, in a dedicated type signalling.

8. The method according claim 7, wherein the step of sending a message to at least one user equipment by means of broadcast or multicast is carried out considering the fraction of user equipments being in reach of the second base station and being in reach of the first base station compared to all user equipments being in reach of the first base station and being capable of communicating to the second base station.

9. A base station operating with a cellular network, covering a first cell area and being connectively coupled to a second base station supporting beamforming, covering a second cell area,
wherein a plurality of user equipments is located in said first cell area,
the base station being configured to:
send a message representative of an instruction to perform at least one automatic neighbor relation measurement to at least one of the plurality of user equipments located in said first cell area, receive at least one automatic neighbor relation message from said at least one user equipment, omit said at least one user equipment from further considering for further automatic neighbor relation evaluation, in case said automatic neighbor relation message indicates that said user equipment is located outside of the second cell area.

10. The base station according to claim 9, wherein said automatic neighbor relation message indicates that said user equipment is located inside the second cell area, in case at least one of the following conditions apply:

the automatic neighbor relation message comprises a measurement result of the second base station;

timing advance to the first base station is lower than a predefined threshold value;

a position value contained in the automatic neighbor relation message matches to the geographical boundaries of the estimated second cell area.

11. The base station according to claim 10, further configured to:

analyze a plurality of automatic neighbor relation messages whether information relating to the second base station are comprised, instruct the second base station to modify beamforming considering the location indications of said plurality of automatic neighbor relation messages.

12. The base station according to claim 11, wherein said information relating to the second base station is at least one out of the group of:

a cell identifier of the second base station, a beam identifier relating to the second base station, a power measurement value of signals received from the second base station, information relating to an identity where a measurement was instructed for.

13. The base station according to claim 12, configured to carry out said sending a message to at least one user equipment by means of at least one of broadcast or multicast signalling, and to carry out a second step of signalling to the at least one user equipment, that is further considered for further automatic neighbor relation evaluation, in a dedicated type signalling.

14. The base station according to claim 13, further configured to carry out sending of a message to at least one user equipment by means of broadcast or multicast considering the fraction of user equipments being in reach of the second base station and being in reach of the first base station compared to all user equipments being in reach of the first base station and being capable of communicating to the second base station.

\* \* \* \* \*